United States Patent
Sato

(10) Patent No.: US 11,590,604 B2
(45) Date of Patent: Feb. 28, 2023

(54) MECHANICAL VIBRATION BONDING APPARATUS AND MECHANICAL VIBRATION BONDING METHOD

(71) Applicant: ULTEX CORPORATION, Fukuoka (JP)

(72) Inventor: Shigeru Sato, Fukuoka (JP)

(73) Assignee: ULTEX CORPORATION, Fukuoka (JP)

( * ) Notice: Subject to any disclaimer, the term of this patent is extended or adjusted under 35 U.S.C. 154(b) by 106 days.

(21) Appl. No.: 16/950,602

(22) Filed: Nov. 17, 2020

(65) Prior Publication Data
US 2021/0187655 A1 Jun. 24, 2021

(30) Foreign Application Priority Data
Dec. 19, 2019 (JP) .............................. JP2019-229190

(51) Int. Cl.
| | | |
|---|---|---|
| B23K 20/10 | (2006.01) | |
| B23K 103/18 | (2006.01) | |
| B23K 103/12 | (2006.01) | |
| B23K 103/10 | (2006.01) | |

(52) U.S. Cl.
CPC .......... *B23K 20/10* (2013.01); *B23K 2103/10* (2018.08); *B23K 2103/12* (2018.08); *B23K 2103/18* (2018.08)

(58) Field of Classification Search
CPC ...................................................... B23K 20/10
See application file for complete search history.

(56) References Cited

U.S. PATENT DOCUMENTS

| | | | | |
|---|---|---|---|---|
| 6,078,125 A | * | 6/2000 | Roberts | ..................... B06B 3/02 |
| | | | | 228/1.1 |
| 9,346,120 B1 | * | 5/2016 | Graff | ........................ B06B 3/00 |
| 2007/0199972 A1 | * | 8/2007 | Chong | .................. B23K 20/10 |
| | | | | 228/1.1 |
| 2013/0284379 A1 | * | 10/2013 | Patrikios | ............... B29C 66/816 |
| | | | | 156/580.1 |
| 2018/0104764 A1 | | 4/2018 | Massa et al. | |

FOREIGN PATENT DOCUMENTS

| | | |
|---|---|---|
| JP | 2009-279657 A | 12/2009 |
| JP | 2016-117100 A | 6/2016 |

OTHER PUBLICATIONS

Office Action dated Sep. 8, 2022 for the corresponding Japanese patent application No. 2019-229190 with an English translation.

\* cited by examiner

*Primary Examiner* — Devang R Patel
(74) *Attorney, Agent, or Firm* — Lucas & Mercanti, LLP

(57) ABSTRACT

A mechanical vibration machining method or the like is suitable for allowing a probe to provide vibration to a horn with high efficiency. A horn portion is supported by a first support portion and a second support portion configured as a double-support structure. A first probe unit and a second probe unit are coupled to both ends of the horn portion. The first probe unit and the second probe unit vibrate the horn portion by means of vibration generated by a first generation unit and a second generation unit. The horn portion provides nodal points at which elongation and contraction alternately occur. For example, in a case in which the contact portion is arranged at the center of the horn portion, the second generation unit is oscillated with a phase that is the opposite of that of the first generation unit.

4 Claims, 4 Drawing Sheets

(a)

(b)

(d)

(c)

(a)

(b)

(c)

(d)

(e)

(a)

(b)

CLAMP
(c)

AFTER BONDING (d)

BENT AFTER BONDING (e)

(a)

(b)

(c)

MECHANICAL VIBRATION BONDING APPARATUS AND MECHANICAL VIBRATION BONDING METHOD

CROSS REFERENCE TO RELATED APPLICATION

This application claims the priority of Japanese Patent Application No. 2019-229190 filed on Dec. 19, 2019, and the entire content thereof is incorporated herein by reference

TECHNICAL FIELD

The present invention relates to a mechanical vibration machining method and a mechanical vibration machining apparatus, and particularly to a mechanical vibration machining method etc., configured to mechanically vibrate a horn portion so as to provide machining.

BACKGROUND ART

Patent document 1 describes an example in which vibration energy is concentrated by means of multiple resonators arranged such that a bonding target member is interposed between them.

CITATION LIST

Patent Literature

[Patent document 1]
Japanese Patent Application Laid Open No. 2016-117100

SUMMARY OF INVENTION

Technical Problem

In the example described in Patent document 1, each resonator is configured to resonate only with a corresponding single probe.

FIG. 4 is a diagram showing an example of a machining apparatus employing a single probe according to a conventional technique. FIG. 4A shows a specific configuration example of a machining apparatus according to a conventional technique. FIG. 4B shows a position relation between a horn, a probe, and an intermediate booster arranged between the horn and the probe. The horn is arranged such that its one end in the longitudinal direction is fixed, and the other end is connected to the probe via the booster. With such an arrangement, maximum vibration points each providing maximum vibration (points each locally judged to provide large vibration) and nodal points each providing minimum vibration (points locally judged to provide small vibration). Typically, the horn is designed such that its contact portion with which it is to be pressed in contact with the machining target matches the maximum vibration point. A horn support portion supports the horn at a nodal point.

With such an arrangement, elongation and contraction alternately occur at each nodal point according to the elongation/contraction of the probe. For example, when the probe elongates, the nodal point that is closest to the probe contracts and the nodal point that is second-closest to the probe elongates. In the same way, elongation and contraction alternately occur at the subsequent nodal points. Conversely, when the probe contracts, the nodal point that is closest to the probe elongates, and the nodal point that is second-closest to the probe contracts. In the same way, elongation and contraction alternately occur at the subsequent nodal points.

However, the horn is arranged such that one end is fixed. Accordingly, as the distance from the probe arranged at the other end of the horn becomes larger, the effect on the horn of the elongation/contraction provided by the single probe becomes smaller. This reduces the maximum output, which is a problem.

FIG. 4C shows an example of metal bonding supported by a machining apparatus according to a conventional technique. In a case in which such bonding is performed with a copper plate (55 mm×50 mm, thickness of 5 mm) arranged as a lower plate and an aluminum plate (51 mm×51 mm, thickness of 3 mm) arranged as an upper plate, a bonding area of 55 mm×3 mm, i.e., 165 $mm^2$ was provided.

Accordingly, it is a purpose of the present invention to provide a mechanical vibration machining method or the like suitable for providing a horn with vibration transmitted from a probe with high precision.

Solution of Problem

A first aspect of the present invention relates to a mechanical vibration machining method employed in a mechanical vibration machining apparatus configured to support machining by mechanically vibrating a horn portion. The horn portion is pressed in contact with a machining target via a contact portion. The mechanical vibration machining apparatus includes: a support portion configured to support the horn portion; and multiple generation units each configured to mechanically vibrate the horn portion. The multiple generation units include: a first generation unit configured to mechanically vibrate the horn portion at a first position; and a second generation unit configured to mechanically vibrate the horn portion at a second position that differs from the first position. The support portion supports the horn portion at a position between the contact portion and the first position and at a position between the contact portion and the second position. The mechanical vibration machining method includes vibrating in which the second generation unit mechanically vibrates the horn portion in synchronization with the first generation unit.

A second aspect of the present invention relates to the mechanical vibration machining method according to the first aspect. In the vibrating, the second generation unit mechanically vibrates the horn portion with a phase that is the opposite of a phase of the first generation unit.

A third aspect of the present invention relates to the mechanical vibration machining method according to the second aspect. The support portion supports the horn portion at least at a first nodal point between the contact portion and the first position and at a second nodal point between the contact portion and the second position. In the vibrating, the first generation unit and the second generation unit are configured such that, when the first nodal point is in a contraction state, the second nodal point is in an elongation state, and such that, when the first nodal point is in an elongation state, the second nodal point is in a contraction state.

A fourth aspect of the present invention relates to a mechanical vibration machining apparatus configured to support machining by mechanically vibrating a horn portion. The mechanical vibration machining apparatus includes: a support portion configured to support the horn portion; and multiple generation units each configured to mechanically vibrate the horn portion. The horn portion is pressed in contact with a machining target via a contact portion. The multiple generation units include: a first generation unit configured to mechanically vibrate the horn portion at a first position; and a second generation unit configured to mechanically vibrate the horn portion at a second position that differs from the first position. The support portion supports the horn portion at a position between the contact portion and the first position and at a position between the contact portion and the second position. The second generation unit mechanically vibrates the horn portion in synchronization with the first generation unit.

Advantageous Effects of Invention

With each aspect of the present invention, by employing multiple generation units, this arrangement allows a reduction of the maximum output to be prevented.

DESCRIPTION OF EMBODIMENTS

Description will be made below with reference to the drawings regarding an example of the present invention. It should be noted that an embodiment of the present invention is not restricted to such an example described below.

Example

Figure 1:
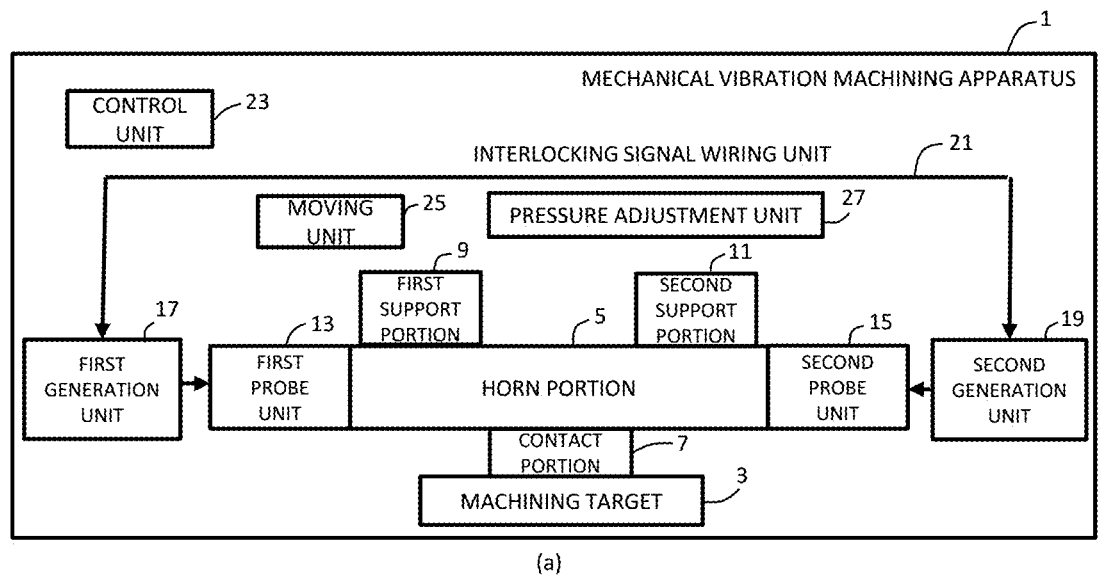
FIG. 1 is a diagram showing an example configuration of a mechanical vibration machining apparatus 1 according to an embodiment of the present invention.
Figure 1:
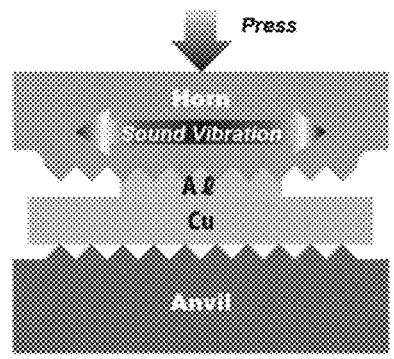
Figure 1:
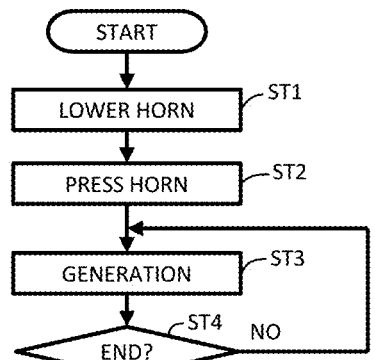
Figure 1:
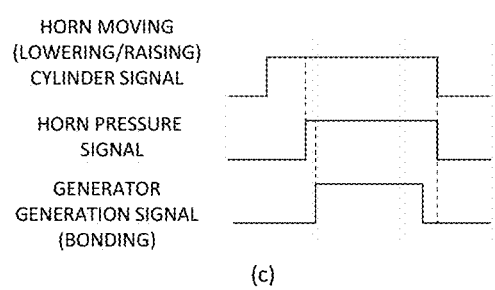

FIG. 1 is a diagram showing an example configuration of a mechanical vibration machining apparatus 1 according to an embodiment of the present invention.

The mechanical vibration machining apparatus 1 includes a horn portion 5 (an example of a "horn portion" in the present invention), a contact portion 7, a first support portion 9, a second support portion 11, a first probe unit 13, a second probe unit 15, a first generation unit 17 (an example of a "first generation unit" in the present invention), a second generation unit 19 (an example of a "second generation unit" in the present invention), an interlocking signal wiring unit 21, a control unit 23, a moving unit 25, and a pressure adjustment unit 27.

The first generation unit 17 and the second generation unit 19 each mechanically vibrate the horn portion 5. Specifically, the first generation unit 17 is arranged at one end of the horn portion 5 in the longitudinal direction (an example of a "first position" in the present invention). Furthermore, the second generation unit 19 is arranged at the other end of the horn portion 5 in the longitudinal direction (an example of a "second position" in the present invention). The first probe unit and the second probe unit respectively transmit vibration generated by the first generation unit 17 and by the second generation unit 19 to the horn portion 5 from both ends thereof. Such an arrangement provides the horn portion 5 with maximum vibration points at which maximum vibration occurs and nodal points at which minimum vibration occurs such that they are alternately arranged. Description will be made below regarding an example in which at least one maximum vibration point occurs at the center of the horn portion 5 in the longitudinal direction and the nodal points occur symmetrically with respect to the center of the horn portion 5 in the longitudinal direction. The contact portion 7 is arranged at the center of the horn portion 5 in the longitudinal direction. Accordingly, the contact portion 7 is vibrated according to the vibration that occurs at the maximum vibration point. The horn 5 is supported by the first support portion 9 and the second support portion 11 via a part of or all the nodal points that are closer to the first support portion 9 side and the second support portion 11 side as compared with the center of the horn portion 5.

The first generation unit 17 and the second generation unit 19 are wired by means of the interlocking signal wiring unit 21. The second generation unit 19 is oscillated with a phase that is the opposite of that of the first generation unit 17 using the interlocking signal wiring unit 21. Accordingly, the second probe unit 15 transmits vibration to the horn portion 5 with a phase that is the opposite of that of the first probe unit 13.

The control unit 23 controls each component of the mechanical vibration machining apparatus 1 using a control signal. The moving unit 25 is configured to lower the horn portion 5 such that the contact portion 7 is pressed in contact with the machining target 3. Furthermore, the moving unit 25 is configured to raise the horn portion 5 such that the contact portion 7 is displaced away from the machining target 3. The pressure adjustment unit 27 adjusts the pressure with which the machining target 3 is pressed by the horn portion 5.

FIG. 1B is a diagram showing a schematic example of a bonding operation supported by the mechanical vibration machining apparatus 1. An aluminum plate is arranged on a copper plate. The horn portion 5 is lowered such that it is pressed in contact with the aluminum plate. Subsequently, mechanical vibration is provided so as to bond the aluminum plate and the copper plate.

FIG. 1C shows an example of the control signals employed by the control unit 23. FIG. 1D is a flowchart showing an example of the operation of the mechanical vibration machining apparatus 1. The control unit 23 sets a horn moving cylinder signal to the ON state so as to instruct the moving unit 25 to lower the horn portion 5 (Step ST1). After the contact portion 7 sufficiently comes in contact with the machining target 3, the control unit 23 sets a horn pressure signal to the ON state so as to instruct the pressure adjustment unit 27 to press the horn portion 5 from above (Step ST2). After pressure is sufficiently applied, the control unit 23 sets an generation signal to the ON state so as to instruct the first generation unit 17 and the second generation unit 19 to perform bonding processing (Step ST3). The control unit 23 judges whether or not the bonding is completed (step ST4). When a program set beforehand by an administrator ends, when a predetermined period of time has elapsed, or when the administrator issues an instruction to end the bonding processing, for example, the control unit 23 judges that the bonding processing ends. After the bonding processing ends, the flow proceeds to Step ST5. When the bonding processing does not end, the flow returns to Step ST3.

In Step ST5, the control unit 23 sets the generation signal to the OFF state so as to instruct the horn portion 5 to not vibrate. Furthermore, the control unit 23 sets the horn pressure signal to the OFF state so as to instruct the pressure adjustment unit 27 to not apply pressure. Subsequently, the control unit 23 sets the horn moving cylinder signal to the OFF state so as to raise the horn portion 5 (Step ST6).

It should be noted that the mechanical vibration machining apparatus 1 may be configured such that an intermediate booster is provided between the first probe unit 13 and the horn portion 5 and between the second probe unit 15 and the horn portion 5.

Figure 2:
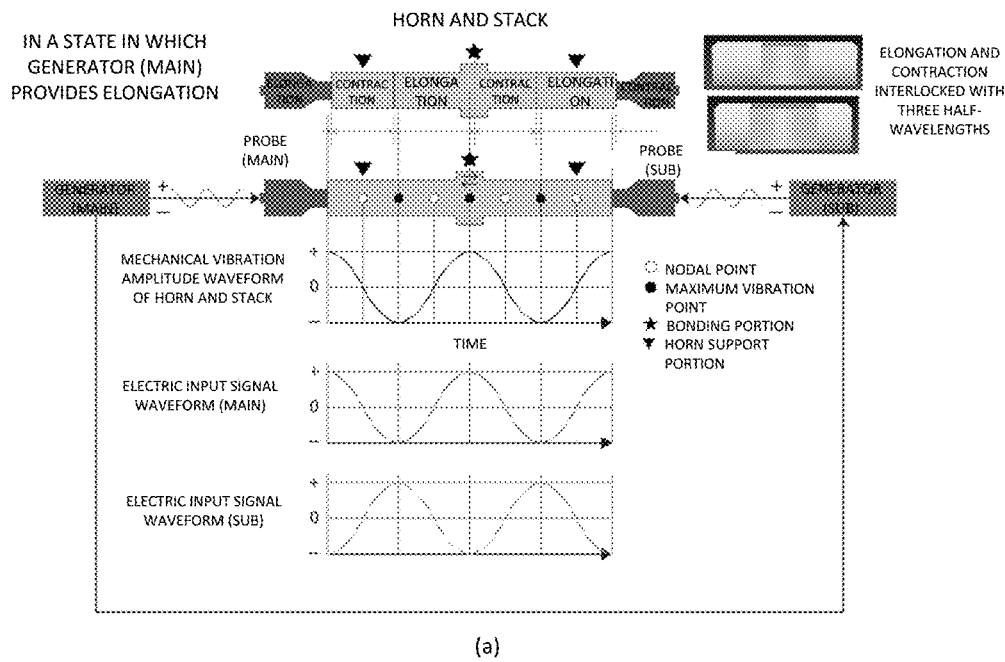
FIG. 2 is a diagram for explaining an example of the elongation/contraction states that occur in a horn portion 5 shown in FIG. 1.
Figure 2:
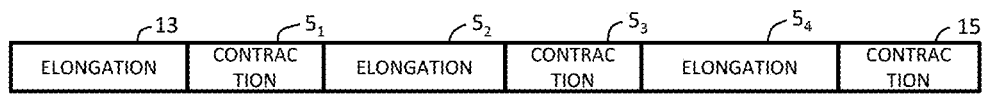
Figure 2:
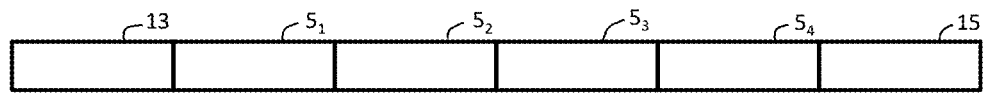
Figure 2:
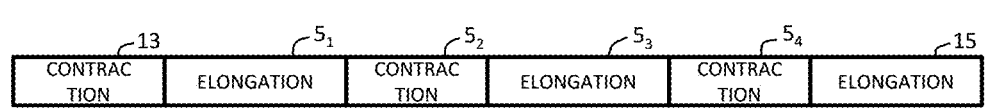
Figure 2:
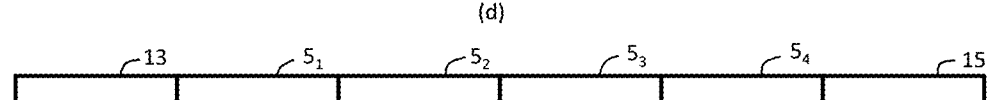

FIG. 2 is a diagram showing an example of elongation and contraction that occurs in the horn portion 5. Description will be made regarding an example in which the first generation unit 17 is configured as a main generator and the second generation unit 19 is configured as a sub generator. The first generation unit 17 oscillates with a sine wave. The second generation unit 19 oscillates with a phase that is the opposite of that of the first generation unit 17. The first probe unit 13 and the second probe unit 15 elongate or contract corresponding to whether the output state of the first generation unit 17 and the output state of the second generation unit 19 are positive or negative. That is to say, when the output state of the first generation unit 17 is positive, the first probe unit 13 elongates. Conversely, when the output state of the first generation unit 17 is negative, the first probe unit 13 contracts. The same can be said of the second probe unit 15. That is to say, when the output state of the second generation unit 19 is positive, the second probe unit 15 elongates. Conversely, when the output state of the second generation unit 19 is negative, the second probe unit 15 contracts.

The horn portion 5 generates three of the maximum vibration points, which will be referred to as a "center maximum point", a "left-side maximum point", and a "right-side maximum point". The center maximum point occurs at the center of the horn 5 in the longitudinal direction. The left-side maximum point and the right-side maximum point occur along the longitudinal direction between the center of the horn 5 and the first probe unit 13 and between the center of the horn 5 and the second probe unit 15, respectively. Description will be made separately regarding each of portions of the horn 5, i.e., a first horn portion $5_1$, a second horn portion $5_2$, a third horn portion $5_3$, and a fourth horn portion $5_4$. The first horn portion $5_1$ is a portion of the horn 5 from the end on the first probe unit 13 side up to the left-side maximum point. The second horn portion $5_2$ is a portion of the horn portion 5 from the left-side maximum point up to the center maximum point. The third horn portion $5_3$ is a portion of the horn portion 5 from the center maximum point up to the right-side maximum point. The fourth horn portion $5_4$ is a portion of the horn portion 5 from the right-side maximum point up to the end on the second probe unit 15 side. With such an arrangement, four nodal points occur, in the first horn portion $5_1$, the second horn portion $5_2$, the third horn portion $5_3$, and the fourth horn portion $5_4$.

The contact portion 7 is provided at a position that corresponds to the center maximum point. The first support portion 9 supports the horn portion 5 at a position that corresponds to the nodal point that occurs in the first horn portion $5_1$ (an example of a "first nodal point" in the present claims). The second support portion 11 supports the horn portion 5 at a position that corresponds to the nodal point that occurs in the fourth horn portion $5_4$ (an example of a "second nodal point" in the present claims).

FIGS. 2B through 2E each show an example of generations generated by the first generation unit 17 and the second generation unit 19, and the elongation/contraction states of the horn portion 5, the first probe unit 13, and the second probe unit 15.

FIG. 2B shows a state when the output state of the first generation unit 17 is positive. In this state, the output state of the second generation unit 19, which is configured to oscillate with a phase that is the opposite of that of the first generation unit 17, is negative. In this state, the first probe unit 13 and the second probe unit 15 are in an elongation state and a contraction state, respectively. With such an arrangement, the first horn portion $5_1$, the second horn portion $5_2$, the third horn portion $5_3$, and the fourth horn portion $5_4$ are in a contraction state, elongation state, contraction state, and elongation state, respectively (i.e., when the first horn portion $5_1$ is in a contraction state, the fourth horn portion $5_4$ is in an elongation state).

FIG. 2C shows a state in which the first generation unit 17 is in a zero-output state. In this sate, the second generation unit 19 is also in a zero-output state. In this stage, the first probe unit 13 and the second probe unit 15 are each returned to their original states. In this state, the first horn portion $5_1$, the second horn portion $5_2$, the third horn portion $5_3$, and the fourth horn portion $5_4$ each return to their original states.

FIG. 2D shows a state when the output state of the first generation unit 17 is negative. In this state, the output state of the second generation unit 19, which is configured to oscillate with a phase that is the opposite of that of the first generation unit 17, is positive. In this state, the first probe unit 13 and the second probe unit 15 are in a contraction state and an elongation state, respectively. With such an arrangement, the first horn portion $5_1$, the second horn portion $5_2$, the third horn portion $5_3$, and the fourth horn portion $5_4$ are in an elongation state, contraction state, elongation state, and contraction state, respectively (i.e., when the first horn portion $5_1$ is in an elongation state, the fourth horn portion $5_4$ is in a contraction state).

FIG. 2E shows a state in which the first generation unit 17 is in a zero-output state. In this sate, the second generation unit 19 is also in a zero-output state. In this stage, the first probe unit 13 and the second probe unit 15 are each returned to their original states. In this state, the first horn portion $5_1$, the second horn portion $5_2$, the third horn portion $5_3$, and the fourth horn portion $5_4$ each return to their original states.

Subsequently, the states shown in FIGS. 2B through 2E are repeated.

It should be noted that, referring to FIGS. 2B and 2D, the elongation/contraction state on the left side with respect to the center shown in FIG. 2B has a symmetrical relation with the elongation/contraction state on the right side with respect to the center shown in FIG. 2D. Furthermore, the elongation/contraction state on the right side with respect to the center shown in FIG. 2B has a symmetrical relation with the elongation/contraction state on the left side with respect to the center shown in FIG. 2D. Accordingly, the same state occurs at the first support portion 9 and the second support portion 11. In contrast, in a case in which only a single probe is employed as in conventional arrangements, there is a difference in the elongation/contraction state between a side that is closer to the probe and a side that is farther from the probe as compared with the contact portion.

Figure 3:
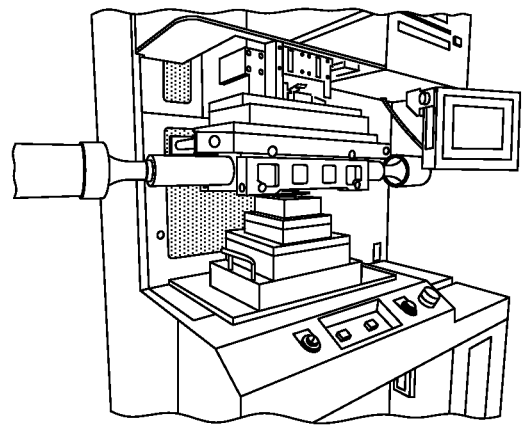
FIG. 3 is a diagram showing a specific example of a mechanical vibration machining apparatus using the present invention.
Figure 3:
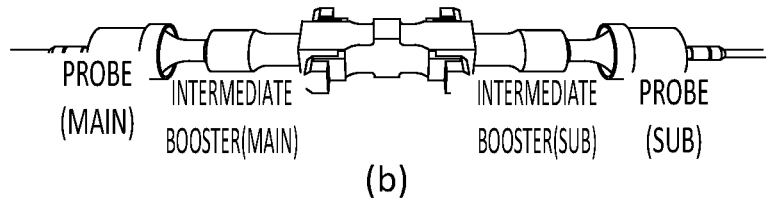
Figure 3:
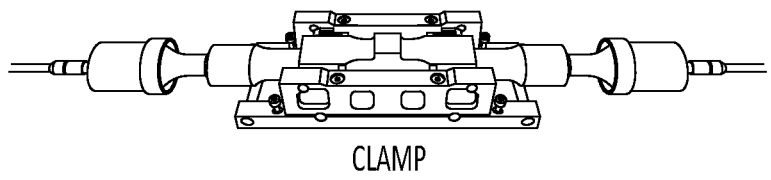
Figure 3:
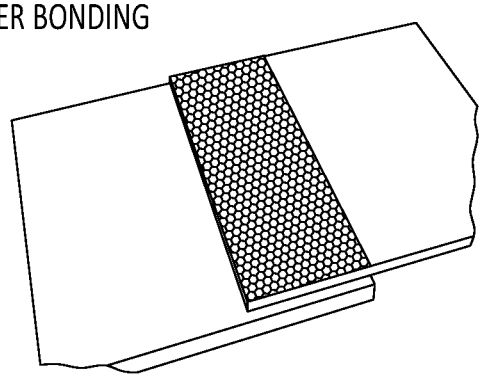
Figure 3:
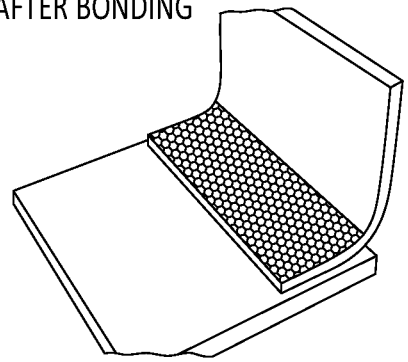

FIG. 3 is a diagram showing a specific example of a mechanical vibration machining apparatus according to the present invention. FIG. 3A shows an example configuration of the mechanical vibration machining apparatus according to the present invention. FIG. 3B shows a position relation between a horn, two probes, and two intermediate boosters arranged between the two probes. A probe is connected to each of both ends of the horn in the longitudinal direction via the corresponding intermediate booster.

Description will be made regarding the intermediate booster. The bonding energy is represented as an integrated amount of energy calculated based on the frequency, amplitude of vibration, applied force, and time. As a method for setting the bonding energy with the amplitude of vibration as a variable, two methods are known. One is an electrical method. With the electrical method, the voltage value applied to the probe from the generation circuit is set the amplitude value. With such an arrangement, digital setting may be made with a percentage representation, for example. The other method is a mechanical method. That is to say, the probe and the horn are coupled via an amplitude-adjustment intermediate booster arranged such that it is interposed between them. Such an arrangement is capable of adjusting the magnitude of vibration by adjusting the cross-sectional area ratio between the inlet and outlet of the sound intermediate booster. For example, in an example shown in FIG. 3B, an intermediate portion of the cylindrical booster is narrowed. With such an arrangement, the basic amplitude of the probe is amplified by 1.5 times at the inlet of the horn. In a case of employing the electrical method, such an arrangement involves a reduction of the maximum output. In contrast, the mechanical method has no effect on the maximum output.

The horn generates maximum vibration points at which maximum vibration occurs and nodal points at which minimum vibration occurs such that they are alternately arranged. Typically, the contact portion, which is to be pressed in contact with a machining target, is arranged at a maximum vibration point. The horn support portion supports the horn at the nodal point. FIG. 3C shows an example in which a clamp is arranged in order to support the horn.

Figure 4:
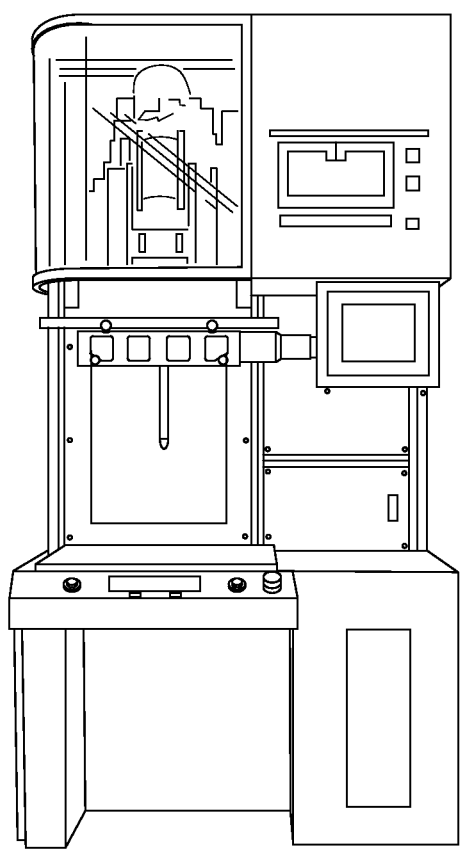
FIG. 4 is a diagram showing an example of a machining apparatus employing a single probe according to a conventional technique.
Figure 4:
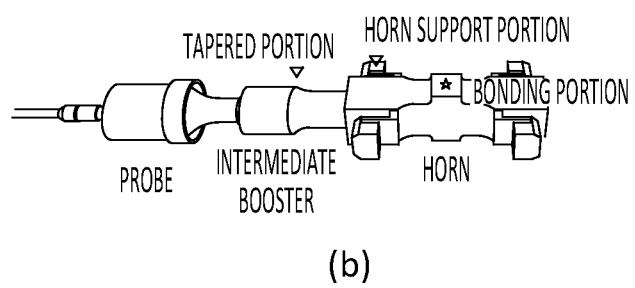
Figure 4:
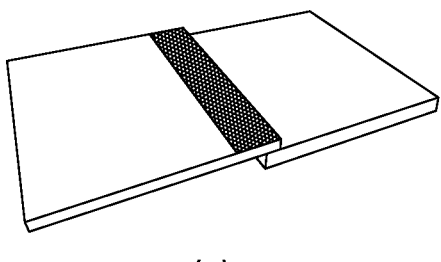

FIGS. 3D and 3E show a bonding result using the mechanical vibration machining apparatus shown in FIGS. 3A through 3C in a case in which, as with a case shown in FIG. 4C, bonding was performed for a copper plate (55 mm×55 mm, thickness of 5 mm) arranged as a lower plate and an aluminum plate (51 mm×51 mm, thickness of 3 mm) arranged as an upper plate. Such an arrangement provides a bonding area (area indicated by "C" in FIG. 3D) of 51 mm×20 mm, i.e., 1,020 mm$^2$). That is to say, such an arrangement allows bonding with a large bonding area of 1,000 mm$^2$ or more. FIG. 3E shows a state in which the bonded plates are bent after the bonding. As a result of a tensile test, the shear strength was 14.6 kN (approximately 1.46 tons of shear strength). Furthermore, the interface resistance value was 0.567 µΩ.

REFERENCE SIGNS LIST 1 mechanical vibration machining apparatus, 3 machining target, 5 horn portion, 7 contact portion, 9 first support portion, 11 second support portion, 13 first probe unit, 15 second probe unit, 17 first generation unit, 19 second generation unit, 21 interlocking signal wiring unit, 23 control unit, 25 moving unit, 27 pressure adjustment unit.

The invention claimed is:

1. A method for bonding a first bonding target and a second bonding target, comprising:
    pressing a contact portion of an apparatus against the first bonding target, wherein the first bonding target is placed on the second bonding target, and the contact portion is located at a center of a single horn of the apparatus in a longitudinal direction; and
    transmitting vibration from a main probe and a sub probe to the single horn, thereby bonding the first bonding target and the second bonding target, wherein the main probe is connected to one end of the single horn, the sub probe is connected to another end of the single horn, and the vibration is generated by a main generation unit connected to the main probe and by a sub generation unit connected to the sub probe,
    wherein maximum vibration points and nodal points are alternately arranged in the longitudinal direction of the single horn, maximum vibration occurs at the maximum vibration points, and minimum vibration occurs at the nodal points,
    wherein the nodal points include a first nodal point and a second nodal point, the first nodal point is located between the contact portion and the main probe, and the second nodal point is located between the contact portion and the sub probe, and
    wherein a support portion of the apparatus supports the single horn at the first nodal point and the second nodal point.

2. The method according to claim 1, wherein the main generation unit is a main generator and the sub generation unit is a sub generator, and
    wherein the sub generator mechanically vibrates the single horn with a phase that is the opposite of a phase of the main generator.

3. The method according to claim 2, wherein the nodal points further include a third nodal point located between the contact portion and the first nodal point, and
    wherein, when the first nodal point is in a contraction state, the second nodal point is in an elongation state, and, when the first nodal point is in an elongation state, the second nodal point is in a contraction state.

4. The method according to claim 1, wherein the main generation unit is a main generator and the sub generation unit is a sub generator.

* * * * *